United States Patent [19]

Gohara et al.

[11] Patent Number: 5,410,909
[45] Date of Patent: May 2, 1995

[54] PLUG PROOF SIMPLE DEVICE TO MEASURE LIQUID FLOW IN FLUE GAS DESULFURIZATION SYSTEMS USING NOZZLE PRESSURE AS AN INPUT

[75] Inventors: Wadie F. Gohara, Barberton; David A. Forrester, Canal Fulton; Steve Feeney, Norton, all of Ohio

[73] Assignee: The Babcock & Wilcox Company, New Orleans, La.

[21] Appl. No.: 252,023

[22] Filed: Jun. 1, 1994

[51] Int. Cl.$^6$ .................... G01F 1/42; G01F 15/00
[52] U.S. Cl. .................... 73/198; 73/861.61
[58] Field of Search ............ 73/198, 861.42, 861.52, 73/861.61, 861.62; 239/74

[56] References Cited

U.S. PATENT DOCUMENTS

| | | | |
|---|---|---|---|
| 1,697,344 | 1/1929 | Campbell | 73/861.61 |
| 3,422,682 | 1/1969 | Evans et al. | 73/861.65 |
| 3,613,448 | 10/1971 | Benson et al. | 73/861.42 |
| 4,163,390 | 8/1979 | Rodder | 73/861.52 |
| 4,787,254 | 11/1988 | Duckworth | 73/861.62 |
| 4,972,180 | 11/1990 | Akai et al. | 73/861.61 |
| 5,325,727 | 7/1994 | Miller et al. | 73/861.61 |

*Primary Examiner*—Herbert Goldstein
*Attorney, Agent, or Firm*—Daniel S. Kalka; Robert J. Edwards

[57] ABSTRACT

An arrangement for measuring a liquid flow through a liquid spray nozzle which provides liquid from a header in a flue gas desulfurization system includes a spool having an outlet and connected to the header and the nozzle for channeling the liquid from the header to the nozzle. The outlet permits an amount of the liquid to be channeled out of the spool; and a conduit is connected to the outlet of the spool for channeling the amount of the liquid from the outlet to the outside of the vessel. A measuring device such as a pressure gauge is located outside of the vessel and is operatively connected to the conduit in order to determine the liquid flow of the nozzle based on the pressure of the liquid channeled through the conduit. A flushing device is operatively connected to the conduit for channeling a flushing liquid through the conduit in order to clean the conduit of any deposits or build-up. A plurality of valves are used in order to regulate liquid flow and purge water flow.

17 Claims, 6 Drawing Sheets

TO NOZZLE

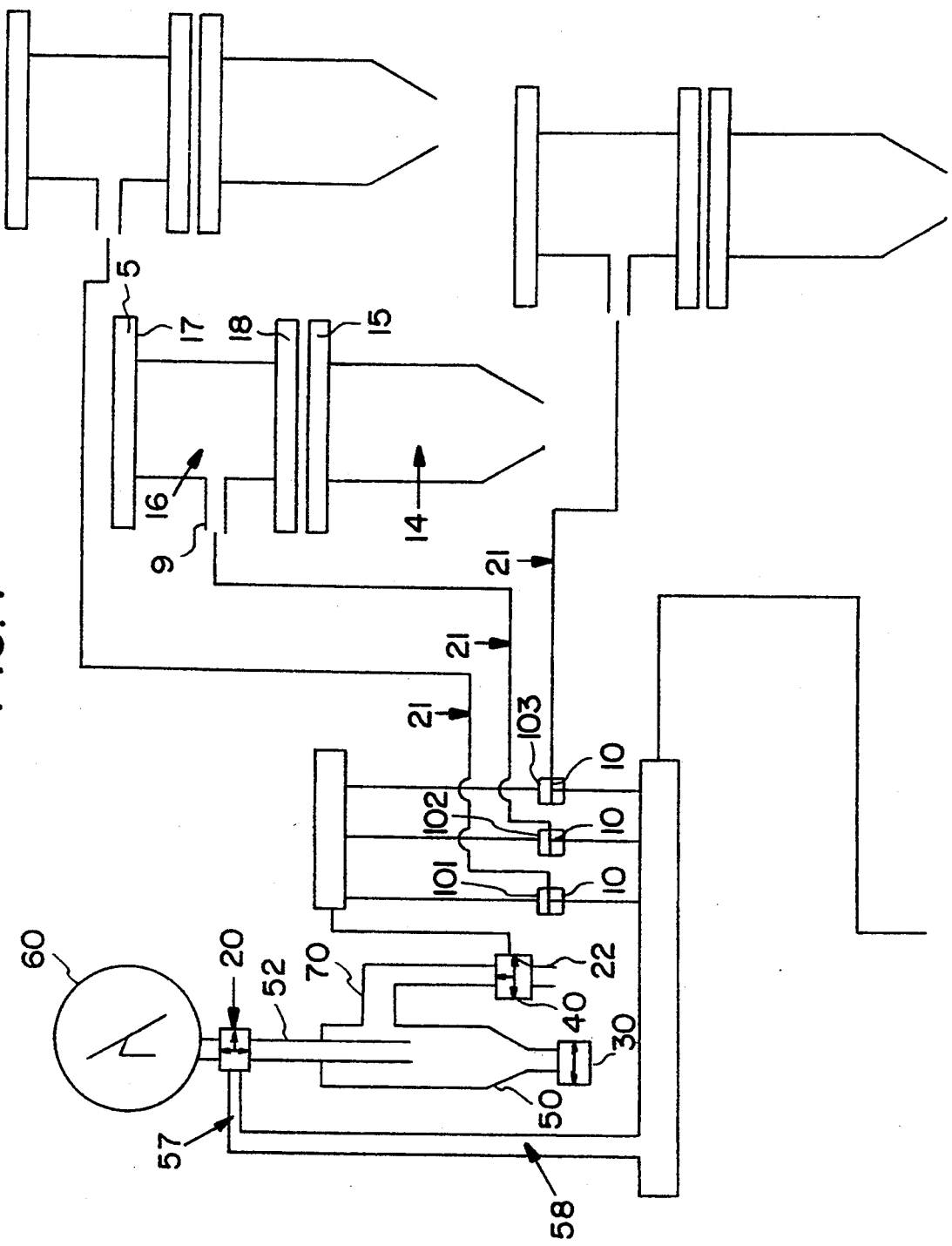

PLUG PROOF SIMPLE DEVICE TO MEASURE LIQUID FLOW IN FLUE GAS DESULFURIZATION SYSTEMS USING NOZZLE PRESSURE AS AN INPUT

BACKGROUND OF THE INVENTION

1. Field of the Invention

The present invention relates, in general, to the desulfurization of flue gas in closed vessels where liquid is sprayed into a gas stream and in particular, to a new and useful arrangement and method for measuring liquid flow in a vessel using the flow pressure at the liquid spraying nozzle.

2. Description of the Related Art

It is well-known that the accurate determination of liquid flow in a flue gas desulfurization (FGD) system is essential to evaluate and optimize the performance of the entire system. Conventional methods such as measuring pump drawn currents and pump total developed head depend largely on the condition of the pump and a well-developed knowledge of the system's resistance. These methods attempt to measure the flow by following measuring the performance of the source and assume that the rest of the system is operating as designed. Ultrasonic meters have been used for such measurements and are nonintrusive; however, they require a certain length of pipe which may not be available in a lot of instances. Magnetic meters have also been used, but are intrusive and require a straight pipe which may not be readily available. Additionally, orifices also have been used; however, the erosive nature of the slurry make their use limited. Moreover, orifice meters are not suited for flow measurements in a vertical run of pipe because of slurry deposition on the downstream face of the orifice and the continuous change in its flow characteristics. In horizontal pipe runs, eccentric orifices are used to reduce both upstream and downstream slurry deposition, but they are susceptible to erosion.

Some global problems encountered with orifice meter use include: the restriction of flow into the header; therefore, unless the system is designed with the orifice meter in mind, the flow characteristics of the system are expected to change with the introduction of the orifice; the flow measured by the orifice is an indication of the flow at the orifice location and if multiple headers branch downstream of the header, there is no indication of the flow at the delivery point to the nozzle; the characteristics of the orifice changes as erosion takes its toll on the orifice; and slurry from the FGD system gets into the orifice taps thereby plugging them, and rendering the orifice useless after a short period of time.

Additionally, pressure gauges having diaphragms have been used in measuring procedures and tend to protect the gauge and overcome the plugging problem. However, they do not solve the other problems encountered with orifices such as those listed above.

Presently, there is no known system or method for measuring fluid flow in a FGD system which is accurate, efficient and has the ability to make direct measurements at the liquid spray nozzle.

SUMMARY OF THE INVENTION

The present invention uses the flow properties of the spray nozzle (the terminal delivery point of the slurry) in FGD system as a means to measure liquid flow through the nozzle. The present invention provides a tap attached to the nozzle which is used as an orifice. The taps are kept functional for extended periods of time by providing flush connections to the tap lines and a means to read the nozzle pressure remotely from the exterior of the scrubber.

The present invention allows for the measurement of the flow at the nozzle by measuring the liquid pressure at the nozzle and relates this pressure to the nozzle characteristics. This arrangement is self-compensating because the pressure at the nozzle and the nozzle flow will change as the nozzle wears out or as the pump performance changes.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is a view similar to FIG. 6 showing a test sequence at valve 101 with a stand by or purge sequence at valves 102 and 103.

DESCRIPTION OF THE PREFERRED EMBODIMENTS

Figure 4:
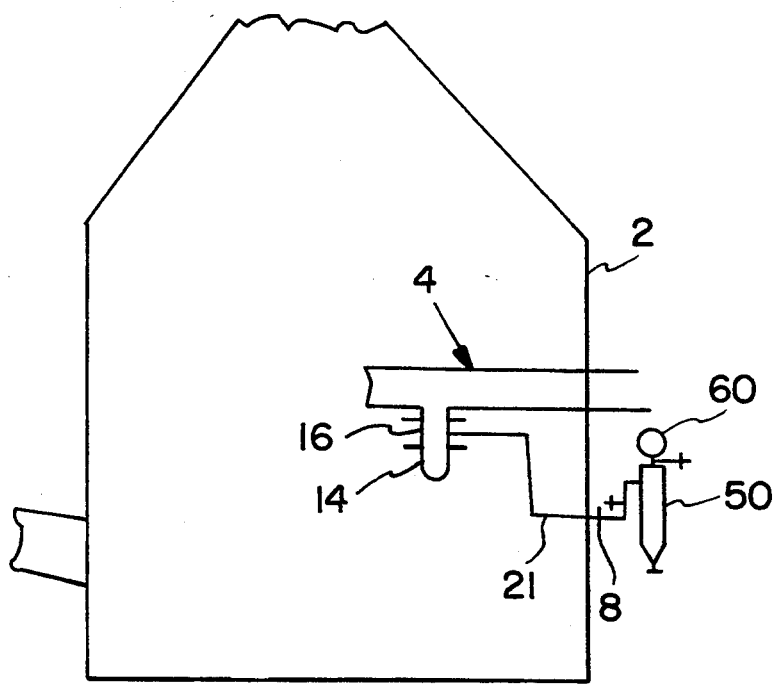
FIG. 4 is a schematic view illustrating an absorber utilizing the arrangement according to the present invention.

The present invention provides for an arrangement and method which utilizes a measuring device such as a pressure gauge 60 for measuring the liquid flow through a spray nozzle 14 used in a flue gas desulfurization (FGD) vessel 2 such as an absorber as shown in FIG. 4. The term liquid as used herein is meant to include a slurry or a liquid. The present invention also provides for a continuous flushing of the arrangement when no measurements are being taken. The arrangement according to the present invention is used to remotely measure the pressure at the spraying nozzle 14 which is located inside the closed vessel 2 while the vessel 2 is in operation.

The present invention provides a means to retrofit existing FGD installations with a measuring and flushing arrangement that can be used on a temporary or permanent basis without requiring extensive work on existing spray headers 4 as shown in FIG. 4. This is particularly important in retrofit instances where the headers 4 are lined with rubber or made of fiberglass reinforced plastic (frp).

Figure 1:
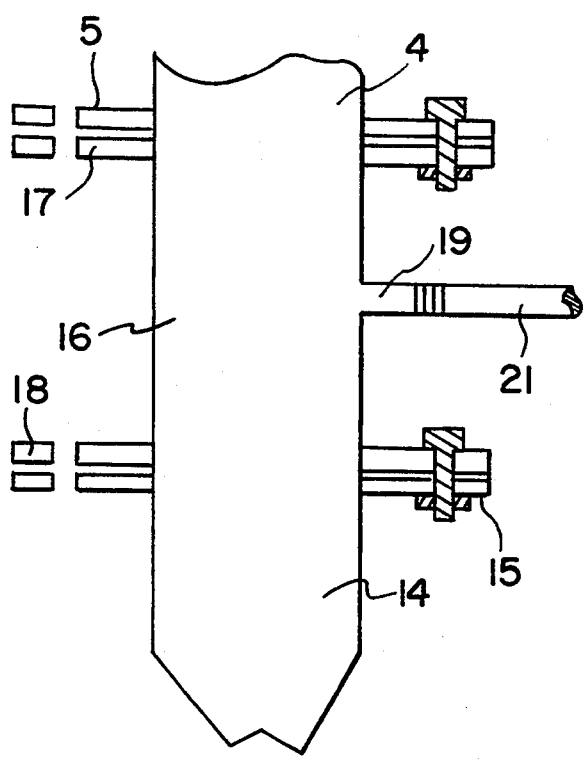
FIG. 1 is a schematic view illustrating a spool connected between a header and a nozzle according to the present invention.

Existing absorber vessels 2, which are closed, are retrofit by connecting a spool 16 between the header 4 and the spray nozzle 14 as shown in FIG. 1. The spool 16 has an opening axially therethrough which allows for the liquid or slurry provided by the header 4 to be channeled through the spool 16 to the nozzle 14 so that the liquid can be sprayed out of the nozzle 14 for desulfurizing the flue gas located within the absorber vessel 2 (FIG. 4). The spool 16 can be connected between the header 4 and the nozzle 14 by any suitable means. However, it is preferable that the spool 16 have an upper flange 17 located at its upper end and a lower flange 18 located at its lower end such that the upper flange 17 is connected to a header flange 5 of the header 4 and the lower flange 18 is connected to a nozzle flange 15 of the nozzle 14 which provides a sufficient bonding and connection between the header 4 and the nozzle 14.

The spool 16 also has an outlet 19, which is a short connector or nipple, which allows for a portion or amount of the liquid or slurry to be channeled out of the outlet 19 as it is being passed from the header 4 through spool 16 to the nozzle 14. It is the pressure of the liquid channeled through outlet 19 which is used to measure the liquid flow as a function of the pressure flow characteristics at the nozzle 14.

Spool 16 is made of an appropriate material such as stainless steel, frp, etc. which can withstand the hot temperatures within the absorber vessel 2 and the pressure of the liquid flowing through the spool. Outlet 19 can be any suitable means for providing a sufficient amount of liquid to be channeled out of the spool 16. However, it is preferable that the outlet 19 be a threaded ½ inch pipe which attaches and leads into the spool 16. A pressure line 21 is connected to the outlet 19 at one end and is led outside of the absorber vessel 2, as shown in FIG. 4, for channeling the liquid pressure at the nozzle which is led through outlet 19 of the spool 16.

The pressure line 21 is a conduit or other suitable type tubing which is capable of withstanding high temperatures and pressures, e.g. about 100° F. to 180° F. and about 1 to 15 psi. Preferably, the pressure line 21 is a high temperature resistant hose or stainless steel tubing having a ½ inch diameter. The pressure line 21 is lead through the wall in the vessel 2 at a flange 8 of the vessel 2 as illustrated in FIG. 4.

Figure 2:
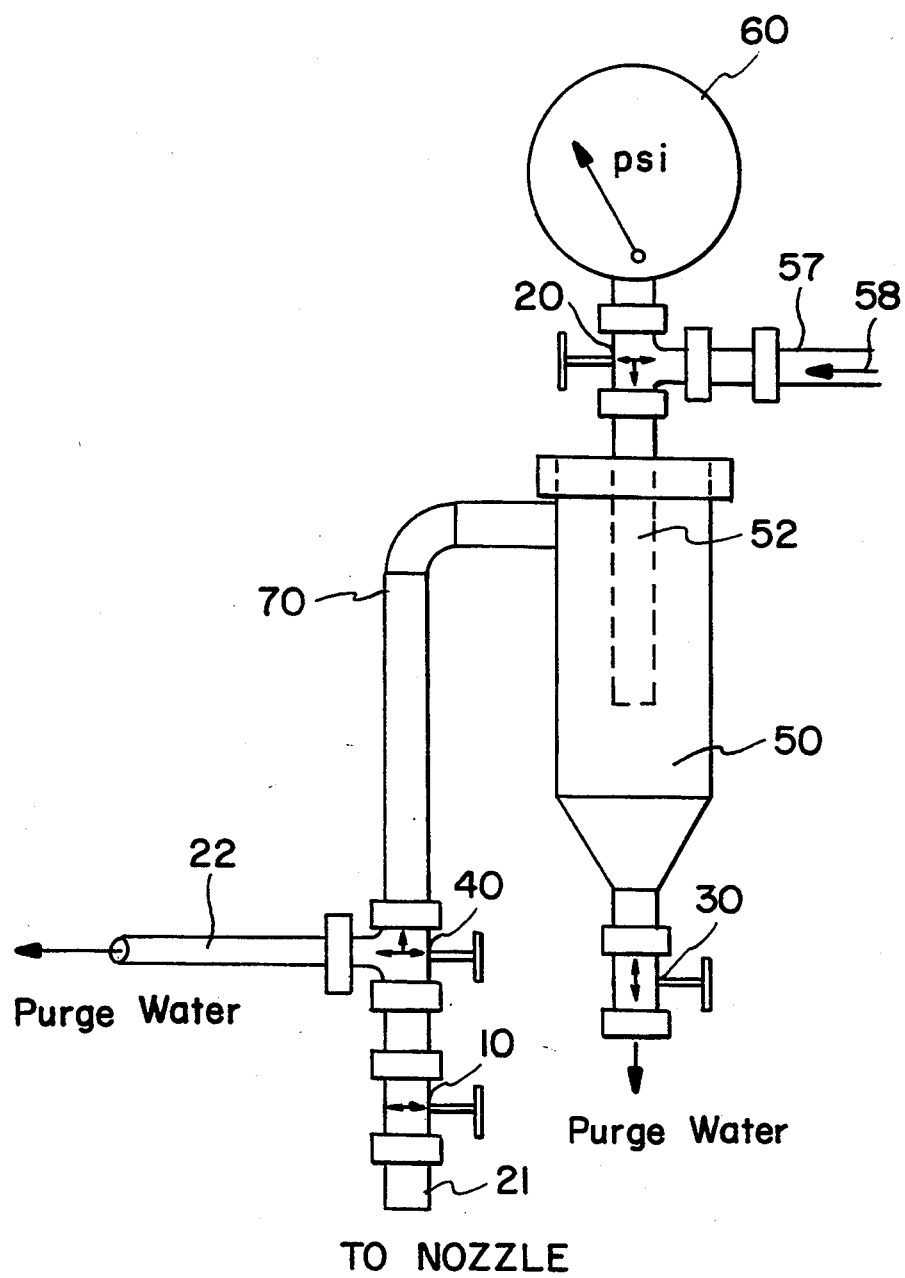
FIG. 2 is a schematic view illustrating an arrangement for measuring a liquid flow for the nozzle of FIG. 1 in a purge mode.
Figure 3:
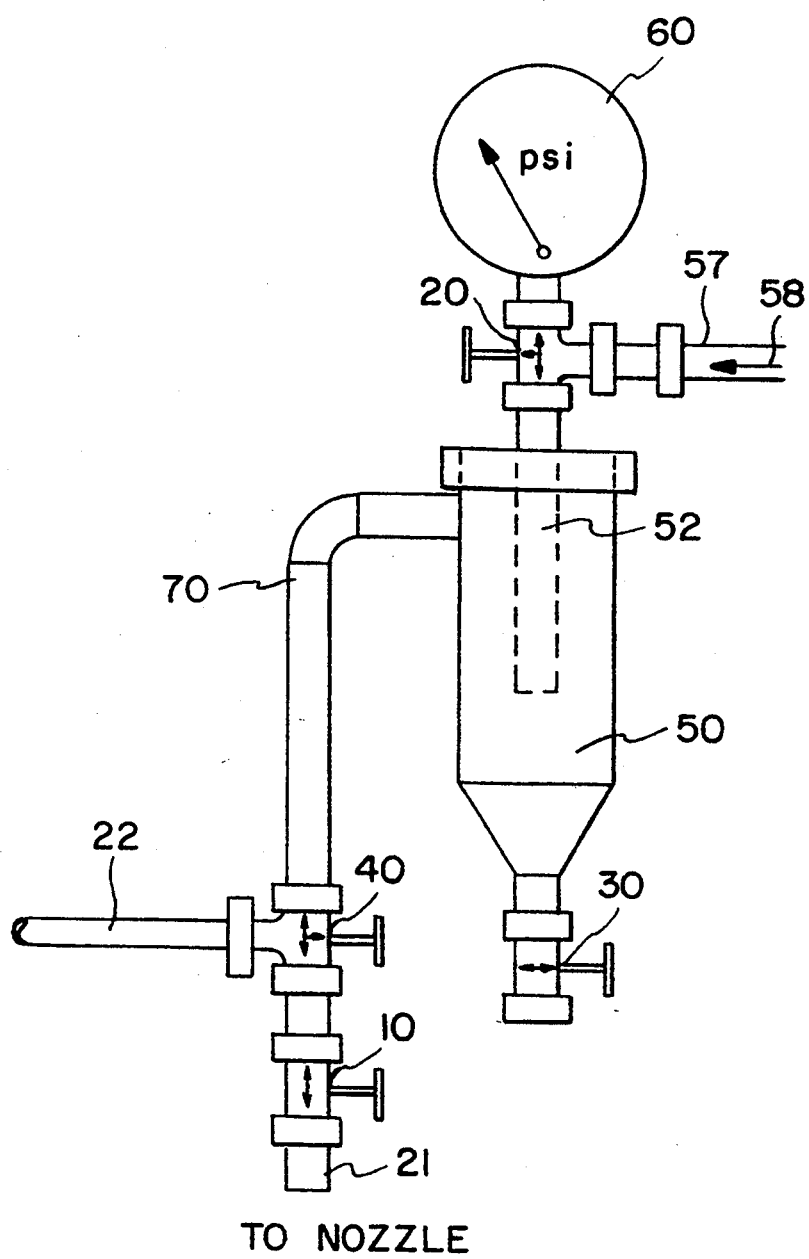
FIG. 3 is a schematic view illustrating the arrangement of FIG. 2 in a test mode.

As illustrated in FIGS. 2 and 3, the pressure line 21 exits the spool 16 outside of the vessel 2 (FIG. 4) to the channels the pressure exerted by the amount of liquid which measuring device 60 such as a pressure gauge. Pressure line 21 is connected to valve 10 and 40 in series at an end opposite the end connected to outlet 19. Valve 40 is a three-way valve which is also connected to a flushing connection line 70 which receives the amount of liquid from pressure line when valves 10 and 40 are in an open position.

A settling chamber 50, which is a closed or sealed housing, is connected to the flushing connection line 70 for containing the amount of liquid channeled through the flushing connection line 70. The settling chamber 50 has a top connection line 52 which vertically extends out of the chamber 50 and also extends axially within chamber 50 to a certain depth of the settling chamber 50. Top line 52 is, in turn, connected to valve 20, which is a three-way valve, at its upper end. The valve 20 is connected to the measuring device 60 which permits the pressure of liquid contained within settling chamber 50, without the solids, to be channeled through the top connection line 52 to the pressure gauge 60 when valve 20 is in an open to test position thereby permitting the gauge 60 to provide an accurate measurement of liquid pressure at the nozzle 14 (FIGS. 1, 3, and 4).

A purge line 57 is connected to valve 20 for providing purge water 58 into the settling chamber 50 through connection line 52 when valve 20 is opened to purge as shown in FIG. 2 to allow the purge water 58 to flow in the manner described above.

By directing the purge water 58 into the settling chamber 50 only, with valve 20 in the open to purge mode, the purge water 58 is, in turn, channeled through flushing connection 70. When valve 40 is opened to pipe 22 to purge solids from connection 70 to drain, purge water 58 may also be channeled through optional valve 10 when opened as in FIG. 5 and pressure line 21 which purges or flushes pressure line 21 of any build-up or deposits which may be contained therein. FIG. 2 depicts optional valve 10 in the closed position so that any solids that settled in chamber 50 or conduit 70 will not back into line 21 and block connection 19. Preferably, FIG. 2 illustrates the purge cycle which then is switched to the stand by cycle seen in FIG. 5.

The purge water 58 pressure is higher than the liquid pressure at the nozzle to provide positive flow towards the nozzle. Purge water 58 is prevented from reaching and influencing pressure gauge 60 due to valve 20 which closes off this avenue of approach, i.e. through measurement connection line 52 best seen in FIG. 5. A purge valve 30 is connected at one end of the settling chamber 50 opposite the top connection line 52 in order to discharge or purge any settled solid in the chamber 50.

Figure 6:
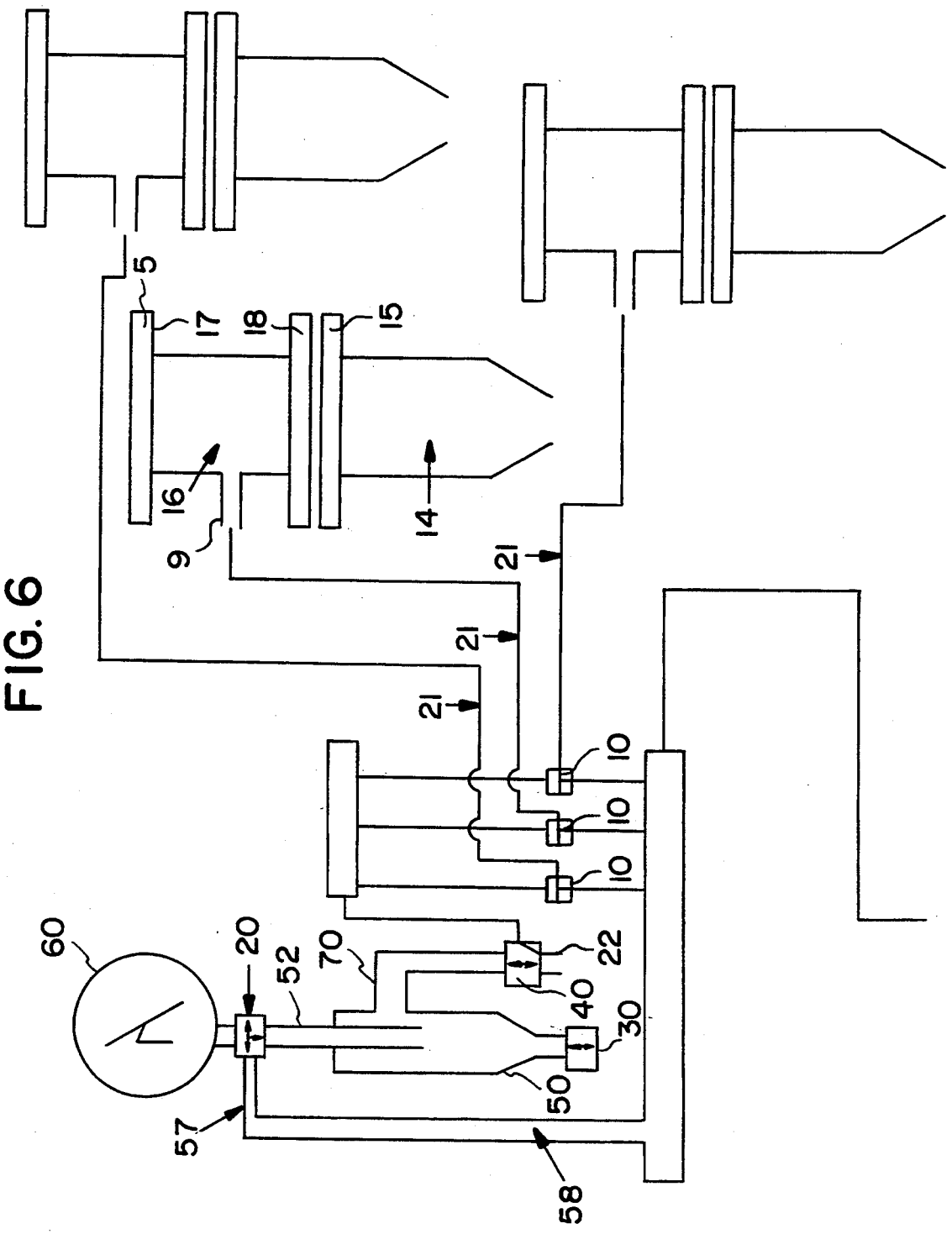
FIG. 6 is a schematic arrangement of multiple nozzles with a single measuring and flushing means showing an overall purge sequence.

An optional isolation valve 10 is connected to the pressure valve 40 so that air and flushing water can be bled from the flushing connection line 70 through connection 22. Isolation valve 10 is preferably employed where one pressure gauge is used to monitor several nozzles 14 as shown in FIGS. 6 and 7. FIGS. 6 and 7 show means to connect several nozzles 14 to one single settling chamber 50, related hardware, and pressure gauge 60, and achieve several measurements from one working station. These several measurements may be incorporated in a central controller or microprocessor operatively connected to and in communication with the pressure measuring device 60 which includes any analog or digital pressure measuring means. FIG. 6 illustrates an overall purge sequence and FIG. 7 depicts a test or measure sequence at valve 101, which is one counterpart of valve 10, with the other counterpart valves 102, 103, etc. are in stand by or purge sequence.

A simple test procedure is used in conjunction with the measuring and flushing arrangement as described above in order to ensure a proper operation of the flushing connection line 70 and the settling chamber 50. This testing procedure is summarized as follows. First, the settling chamber 50 is filled with flush water 58 from purge line 57. Purge valve 20 and flushing valve 40 are then opened to a purge position through 22 shown in FIG. 2, and flush valve 30 is opened to flush out any sediments or air bubbles in the system. The flow of purge water 58 through valves 30 and 40 verifies that the arrangement according to the present invention is clear.

Figure 5:
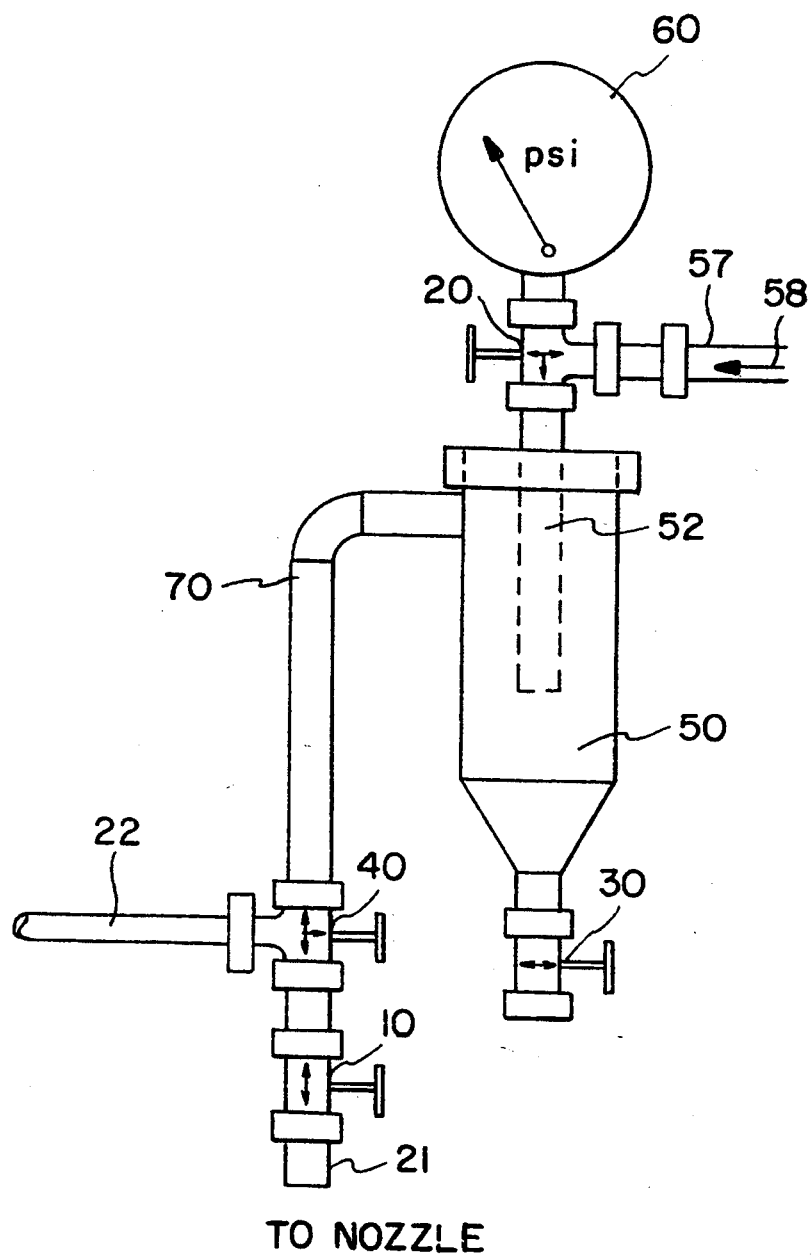
FIG. 5 is a schematic view illustrating the arrangement in a stand by sequence.

After proof of positive flow through pipe 22, the chamber valve 30 is closed and valve 40 is moved to the test position and valve 10 is opened to fill pressure line 21 with slurry as seen in FIG. 5. Measuring valve 20 is moved to its open position, which is a test positionally, shown in FIG. 3. In turn, pressure valve 20 and isolation valve 10 are then moved to their open position, i.e. its test or measure position, as shown in FIG. 3.

The line pressure from the nozzle must be able to reach pressure gauge 60 without forcing slurry or solids up through line 52 and into gauge 60. In order to test the arrangement, the pressure valve 40 and isolation valve 10 are moved to their open or test position and valve 30 is closed while valve 20 is opened in the test position as seen in FIG. 3. Thus, the pressure from the slurry will be exhibited at the pressure gauge 60. This will allow for a measurement to be taken by pressure gauge 60.

Referring to FIG. 2, after the measurement by gauge 60, the system is purged by moving valve 40 to its open to purge position while valve 30 is open and valve 20 is opened to its purge position and valve 10 is closed. Next, referring to FIG. 5, once the settling chamber 50 has been purged, valve 30 is closed in order to ensure purging of connection line 70. Valve 40 is then moved to its open to test position and isolation valve 10 is opened to test position to purge the pressure line 21 from the exterior of the absorber vessel 2 (FIG. 4) and through the vessel 2 through the nozzle 14. This purge flow is maintained through pressure line 21 until a next measurement is required. At that time, the flow is ceased, and the appropriate valves are adjusted in order to regulate an amount of liquid to be provided to the pressure gauge 60 for measurement.

Of course, all of the valves may either be controlled manually or automatically through a microprocessor or controller such as a computer (not shown).

The present invention provides several advantages which are summarized as follows: the arrangement is simple, inexpensive and adaptable to any existing or new installation; use of spool 16 allows for a testing crew to measure liquid flow at different locations without extensive or expensive modifications; the flow is measured at the target not at the source; the flushing connection allows for remote measurements in any location in the absorber 2 without disruption to operation. Measurement at the nozzle (final target) eliminates any guess work due to header scaling or plugging. The present invention can be used also to check for flow unbalance and distribution problems in a header when used in accordance with FIGS. 6 and 7 and when the various nozzles are located on the same header.

Currently, attempts to measure the pressure at the nozzle is performed by replacing the nozzle with a pressure gauge close to a door or viewing port. This limits the tester's ability to measure at different locations in the vessel if problems are suspected in an area far from such doors.

Other advantages include that the flushing connection allows data to be gathered over a prolonged period of time without line plugging with slurry or exposing the pressure gauge to the harsh environment of the slurry. Due to the flushing connection's ability to protect the pressure gauge, any available pressure gauge can be used which eliminates the need for diaphragm equipped gauges; and a traverse or mapping of the absorber nozzles can be performed simultaneously at a fairly low cost.

While specific embodiments of the invention have been shown and described in detail to illustrate the application of the principles of the invention, it will be understood that the invention may be embodied otherwise without departing from such principles.

What is claimed is:

1. An arrangement for measuring a liquid flow through a spray nozzle which is provided with the liquid from header means for spraying the liquid within an absorber vessel, the arrangement comprising:

a spool having an inlet connected to the header means and a first outlet connected to the nozzle, said spool having an opening axially therethrough for channeling the liquid from the header means to the nozzle for being sprayed in the absorber vessel by the nozzle, said spool further having a second outlet for permitting a portion of the liquid to be channeled out of the spool;

conduit means connected to the second outlet of the spool for channeling the liquid from the second outlet to the exterior of the absorber vessel;

measuring means remotely located outside the absorber vessel, said measuring means being operatively connected to the conduit means and receiving the liquid from the second outlet for determining a liquid flow for the nozzle based on pressure of the liquid channeled through the conduit means; and flushing means operatively connected to the conduit means for channeling a flushing liquid through the conduit means for cleaning the conduit means.

2. The arrangement according to claim 1, further comprising valve means for regulating the channeling of the liquid and the channeling of the flushing liquid.

3. The arrangement according to claim 1, further comprising a settling chamber connected to the conduit means for receiving and containing the liquid channeled from the second outlet, the settling chamber being operatively connected to the measuring means and the flushing means.

4. The arrangement according to claim 3, further comprising valve means for regulating the channeling of the liquid and the channeling of the flushing liquid.

5. The arrangement according to claim 4, wherein the valve means comprises a first valve operatively connected to the settling chamber and the measuring means for regulating the channeling of the flushing liquid into the settling chamber and the flushing means and for regulating the channeling of the liquid to the measuring means.

6. The arrangement according to claim 5, wherein the valve means further comprises a second valve operatively connected to the flushing means and the conduit means for regulating the channeling of the liquid to the flushing means and the settling chamber and for regulating the channeling of the flushing liquid from the chamber and the flushing means to the conduit means.

7. The arrangement according to claim 6, wherein the valve means further comprises a third valve operatively connected to the settling chamber for regulating a purging of the flushing liquid and the liquid from the settling chamber.

8. The arrangement according to claim 7, wherein the valve means further comprises a fourth valve operatively connected to the flushing means.

9. The arrangement according to claim 1, wherein the measuring means includes a pressure gauge.

10. A method for measuring a liquid flow through a liquid spray nozzle which is provided with the liquid from a liquid header for spraying the liquid within an absorber vessel, the method comprising the steps of:

connecting a spool having an inlet to the header and a first outlet to the nozzle for channeling the liquid from the header to the nozzle, the spool further including a second outlet for permitting a portion of the liquid to be channeled through the second outlet of the spool;

connecting a conduit to the second outlet and leading the conduit outside of the absorber vessel;

channeling the portion of the liquid from the second outlet to outside of the absorber vessel;

connecting measuring means to the conduit outside of the absorber vessel;

determining a liquid flow for the nozzle based on the pressure of the liquid channeled through the conduit;

connecting flushing means to the conduit outside of the absorber vessel; and channeling a flushing liquid through the conduit.

11. The method according to claim 10, further comprising the step of regulating the channeling of the liquid to the measuring means.

12. The method according to claim 11, further comprising the step of regulating the channeling of the flushing liquid through the conduit.

13. The method according to claim 12, further comprising the step of providing a settling chamber in the conduit outside the absorber vessel for containing the liquid and the flushing liquid.

14. The method according to claim 13, further comprising the step of purging the liquid and the flushing liquid from the settling chamber.

15. The method according to claim 14, further comprising the step of regulating the purging of the liquid and the flushing liquid from the settling chamber.

16. The method according to claim 15, further comprising the step of purging air from the conduit.

17. The method according to claim 16, further comprising the step of regulating the purging of the air from the conduit.

* * * * *